Patented Mar. 28, 1950

2,502,222

UNITED STATES PATENT OFFICE 2,502,222

METHOD OF PREPARING PHENYL MERCURIC ACETATE AND NITRATE

Julius F. Kaplan and Charles Mellick, Chicago, Ill., assignors to The Edwal Laboratories, Inc., Chicago, Ill., a corporation of Illinois No Drawing. Application April 16, 1945, Serial No. 588,724

15 Claims. (Cl. 260—434)

This invention relates to the preparation of certain phenyl mercuric salts, namely, the acetate and the nitrate, the mercury being combined directly onto the benzene nucleus. The invention is especially concerned with a novel process for preparing the aforesaid compounds wherein outstanding advantages are achieved in relation to simplicity of operation, saving in time, yields and, of course, concomitant reduction in cost of preparation of said compounds.

Phenyl mercuric compounds, notably the monomercurated compounds such as phenyl mercuric acetate and phenyl mercuric nitrate, have been widely used as bactericides, fungicides, mildew proofing agents, diuretics, and as intermediates for the preparation of other compounds. The methods heretofore known for the production of such compounds have, however, been very unsatisfactory in that they are cumbersome to operate.

Thus, for example, the direct monomercuration of benzene with mercuric salts, such as mercuric acetate, proceeds very slowly at temperatures below 100 degrees C. Even the use of alcohol in the reaction mixture to facilitate the removal of the acetic acid in the form of the ester thereof (J. A. C. S., 46, page 1510 (1924)) necessitates carrying out the reaction over a long period of time at refluxing temperatures at atmospheric pressure. To speed up the reaction, higher temperatures have been utilized but this has required the employment of expensive autoclaves, accompanied by the various other disadvantages which result from the use of high pressure methods and equipment; or, alternatively, the reaction has been carried out at atmospheric pressure at high temperatures in the presence of a high boiling solvent, such as nitrobenzene or dichlorbenzene. This latter procedure is objectionable because of the impure character of the desired product and the complexity of isolating or separating the latter from the reaction mixture.

Kobe and co-workers (Industrial and Engineering Chemistry, vol. 34, pp. 309–313, March, 1942 and U. S. Patent No. 2,353,312), in an effort to overcome various disadvantages of known processes, evolved a particular method of monomercurating benzene wherein the mercurating agent, for example, mercuric acetate, is added to the aromatic compound, in an autoclave under pressure, at a rate sufficiently slow so that the concentration of the mercurating agent in the reaction mixture does not exceed 0.05 gram-mols per liter. As a result of this procedure, Kobe et al. state that the formation of the undesired polymercurated compounds is inhibited. Here, again, the method is cumbersome.

In accordance with the present invention, a simple method of mercurization of benzene to produce phenyl monomercuric acetate or nitrate has been discovered, the method being highly economical because it may be carried out at ordinary or atmospheric pressures, avoiding the necessity for the use of autoclaves, and, despite the fact that pressures above atmospheric pressure are not employed, the reaction period or mercuration time is materially reduced over that required in heretofore known processes. Furthermore, the method of the present invention results in high yields, in the usual case of the order of 70% to 93%, of the desired phenyl mercuric acetate or nitrate, based on the mercury compound used, and the same are easily recovered from the reaction mixture by simple, conventional procedures. The practice of the present invention also renders it unnecessary to resort to the technique of carefully controlling the addition of the mercurating agent to the benzene (see Kobe et al., supra). Indeed, the practice of the process of the present invention need and preferably does involve essentially only simple admixture of the reactants, carrying out the reaction at the desired temperature at atmospheric pressure, and recovery of the phenyl mercuric acetate or nitrate from the reaction mixture.

In accordance with the present invention, the important improvements which have been outlined above are obtained by carrying out the mercuration reaction in the presence of fluorides of hydrogen, boron or antimony, as, for example, aqueous or anhydrous hydrofluoric acid, boron trifluoride, and antimony trifluoride. Instead of using the aforesaid fluorides as such, or in the form of a solution thereof or the like, any agent which will form or liberate any of the aforesaid fluorides in the reaction mixture may be utilized and, wherever reference is made in the claims to the aforesaid fluorides, it will be understood to encompass such materials. Boron trifluoride is unusually satisfactory. The proportions of the aforesaid fluorides which may be utilized are subject to considerable variation but good results are, in general, obtained by employing from about 1 to about 20 mol per cent, preferably from about 3 to about 10 mol per cent, per mol of mercuric oxide or mercurating agent, or of the order of about 0.03% to about 3% based on the weight of the total reactants. While materially greater proportions of said fluorides may be employed, their use is ordinarily not of sufficient advantage to be warranted.

In order that those skilled in the art may more fully understand the nature of the present invention, the following illustrative examples are set forth. It will be appreciated that the proportions of reacting ingredients, times of reaction, order of steps, and temperatures may be varied, as pointed out hereafter, and that supplementary processes of purification and the like may be resorted to wherever found desirable or convenient. These and other variations and modifications will be evident to those skilled in the art in the light of the guiding principles which are disclosed herein.

Example I (a) 1020 cc. of glacial acetic acid and 40 cc. of a glacial acetic acid solution of boron trifluoride containing 8 g. of boron trifluoride were placed in a 5-liter flask fitted with a reflux condenser and mechanical stirrer. 240 g. of red mercuric oxide were added and caused to go into solution by heating at about 40–60 degrees C. and stirring. 990 cc. of benzene were then added to the clear solution and the resulting reaction mixture was refluxed gently for about 2 hours. The solution was concentrated in vacuo to about 500 cc., the distillate therefrom being condensed and recovered, and was then poured slowly into 2 liters of cold water. The resulting precipitate of phenyl mercuric acetate was filtered off, was washed with three 350 cc. portions of cold water, and was then allowed to air-dry.

The air-dried phenyl mercuric acetate melted at 148.4 degrees C. (corrected) and weighed 348 g. (93% based on mercuric oxide used). The mercury content was 60.4%; the calculated mercury content of phenyl mercuric acetate, $C_8H_8O_2Hg$, is 59.6%.

(b) The mixture of benzene, acetic acid, and water, composing the distillate from the concentration of the reaction mixture in part (a) hereof, was titrated to determine acetic acid content. The balance was assumed to be benzene. Additional acetic acid, boron trifluoride and mercuric oxide were then added to bring the proportions or ratios of reactants up to those set forth in part (a) hereof, and the mixture was refluxed for about 2 hours. It was then concentrated in vacuo to about one-fourth its volume, the concentrate was poured into water, and the phenyl mercuric acetate was recovered as described in part (a) hereof, white phenyl mercuric acetate melting at 146–148 degrees C. being recovered in 84% yield.

Example II 3570 cc. of glacial acetic acid (tech.) and 70 cc. of a glacial acetic acid solution of boron trifluoride containing 14 g. of boron trifluoride were mixed in a 12-liter flask equipped with a condenser and mechanical stirrer. Then 840 g. of technical mercuric oxide were added and the mixture was stirred and gently heated at about 40–55 degrees C. for about 15 minutes. 3465 cc. of benzene (tech.) were added to the resulting clear solution and the mixture was refluxed at about 81 degrees C. for 1½ hours. The reaction mixture was concentrated in vacuo to about 2 liters, filter cell was added, and the hot mixture was filtered. The orange colored filtrate was slowly poured into 8 liters of cold water under stirring. The resulting precipitate was filtered off, was washed with three 500 cc. portions of cold water, and was allowed to air-dry.

The yield was 970 g. (74% based on mercuric oxide) of white phenyl mercuric acetate.

Example III 102 cc. of glacial acetic acid and 4 cc. of a glacial acetic acid solution containing 0.4 g. of boron trifluoride were charged to a 500 cc. flask fitted with a reflux condenser and mechanical stirrer. 24 g. of red mercuric oxide were added and caused to go into solution by heating to about 50–60 degrees C. and stirring. When solution was complete, 99 cc. of benzene were added and the reactants refluxed for a period of about 2 hours. At the end of this time, the reaction mixture was concentrated to a volume of approximately 50 cc. by distillation at atmospheric pressure. The concentrate was slowly stirred into 200 cc. of cold water and the solid precipitate removed by filtration. The phenyl mercuric acetate was obtained in 78.2% of the theoretical yield.

Example IV 24 g. of yellow mercuric oxide were dissolved in 102 cc. of glacial acetic acid contained in a 500 cc. flask fitted with a mechanical stirrer and reflux condenser. 99 cc. of benzene were added, followed by 4 cc. of a glacial acetic acid solution containing 0.4 g. of boron trifluoride. The reactants were refluxed for a period of about 2 hours. Then the reaction mixture was concentrated to approximately 50 cc. by distillation in vacuo. The concentrate was slowly poured into 200 cc. of cold water, and the solid precipitate removed by filtration. After washing with several portions of cold water, it was dried in an oven at 100 degrees C., 26 g. of phenyl mercuric acetate being obtained, about 69.7% of the theoretical.

Example V 24 g. of red mercuric oxide were dissolved in 102 cc. of glacial acetic acid contained in a 500 cc. flask fitted with a stirrer and reflux condenser. After solution was complete, 99 cc. of thiophene-free benzene were added together with 4 cc. of a glacial acetic acid solution of boron trifluoride containing 0.4 g. of boron trifluoride. The reaction mixture was refluxed for about 2 hours after which it was concentrated to approximately 50 cc. The concentrate was slowly poured into 200 cc. of cold water and the resulting solid precipitate removed by filtration. It was washed with several portions of cold water, and dried at 100 degrees C. in an oven. 29.1 g. of phenyl mercuric acetate were obtained, equivalent to 78% of theoretical yield. The product was almost white and melted at 147–149 degrees C.

Example VI 102 cc. of glacial acetic acid were placed in a 500 cc. flask fitted with a reflux condenser and mechanical stirrer. 37.9 g. of mercuric nitrate were then added thereto, and then there were added 99 cc. of benzene and 4 cc. of a glacial acetic acid solution of boron trifluoride containing 0.8 g. of boron trifluoride. The mixture was refluxed for a period of 2 hours. After cooling, the reaction mixture was filtered and the filtrate was concentrated, under reduced pressure, to a volume of about 50 cc. The resulting concentrate was then filtered hot and the filtrate was then poured into 200 cc. of cold water. A 73% yield of basic phenyl mercuric nitrate was obtained. The product, on analysis, showed a mercury content of 63.5%. The theoretical mercury content of basic phenyl mercuric nitrate is 63.2%.

Example VII 102 cc. of glacial acetic acid were placed in a 500 cc. flask fitted with a reflux condenser and mechanical stirrer. 24 g. of red oxide of mercury were then added and caused to go into solution by gentle heating. 4 cc. of 47% hydrofluoric acid solution were added followed by the addition of 100 cc. of benzene. The reaction mixture was refluxed for a period of about 2 hours. The resulting reaction mixture was then concentrated, under reduced pressure, to a volume of about 50 cc., filtered hot, and then poured slowly into 200 cc. of cold water. Phenyl mercuric acetate, having a melting point of 148-151 degrees C., was recovered in a yield of 71.3%. The mercury content thereof was 60.1%.

*Example VIII*

102 cc. of glacial acetic acid were placed in a 500 cc. flask fitted with a reflux condenser and mechanical stirrer. 24 g. of red oxide of mercury were then added and caused to go into solution by gentle heating. Thereupon, 99 cc. of benzene were added, followed by 3 g. of antimony trifluoride. The reaction mixture was refluxed for a period of 2 hours. After cooling, the reaction mixture was filtered, concentrated, under reduced pressure, to a volume of about 50 cc., filtered hot, and the filtrate poured slowly into 200 cc. of cold water. Phenyl mercuric acetate, having a melting point of 148-153 degrees C., was recovered in a yield of 57.3%. The product had a mercury content of 60.3%.

The invention has especial utility for the production of phenyl monomercuric acetate and in the preparation thereof, as shown in the examples, the mercurating agent may be mercuric acetate as such, or mercuric acetate resulting from dissolving mercuric oxide in acetic acid, particularly glacial acetic acid. It may also be pointed out that it is generally desirable to carry out the process for the preparation of the phenyl mercuric acetate or phenyl mercuric nitrate in an acetic acid solution, particularly glacial acetic acid, since the acetic acid serves as a mutual solvent for the mercurating agent and the benzene. Other solvents are disclosed, for example, in U. S. Patent No. 2,353,312.

It is preferred particularly to carry out the mercurization reaction, in accordance with the present invention, at refluxing temperatures at atmospheric pressure. However, in certain cases the reaction may be carried out at about 40 degrees C. or even at room temperature but, in such cases, the reaction takes a somewhat longer period of time and it is desirable, therefore, to operate at somewhat higher temperatures such as at about 50 degrees to about 80 degrees C. and, as previously stated, especially at refluxing temperatures. In such cases, the reaction is usually completed in from about 1 to 4 hours.

In general, for obtaining the best results, the benzene is employed in molal excess over that required to react with the mercurating agent to produce the phenyl mercuric compound. It is desirable, in general, that the benzene be present in a molal excess of about 3 to 20 mols, particularly about 7 to 12 mols, for each mol of mercurating agent. Similarly, the acetic acid or the like is preferably present in proportions of about 5 to about 25 mols, particularly 15 to 20 mols, per mol of mercuric oxide or other mercurating agent.

While the full advantages of the invention will be obtained in at least most cases by carrying out the mercurization at ordinary atmospheric pressures, it will be understood that, within the broader aspects of the invention, the utilization of greater than atmospheric pressures and, for that matter, subatmospheric pressures is not precluded. In other words, by conducting the mercurization reaction in the presence of any one or a mixture of any two or more of the aforesaid fluorides, various advantages accrue even if other than ordinary atmospheric pressures are employed. Similarly, if desired, the utilization of the aforementioned Kobe et al. technique of controlled addition of the mercurating agent may be employed in conjunction with the use of said fluorides.

As shown in Example I (b), the method may readily be utilized as a cyclic method, the benzene and the acetic acid or other similar solvent being recovered and re-used.

It will be understood that, wherever the term "mercurization" or equivalent terminology is employed in the present specification and claims, the reaction covered thereby is one wherein mercury is combined directly onto the aromatic nucleus.

While the invention has been described in detail, it is to be understood that the scope thereof is not to be limited other than is set forth in the claims.

What is claimed and desired to be protected by Letters Patent of the United States is:

1. In a method of producing a mercuric salt selected from the group consisting of phenyl mercuric acetate and phenyl mercuric nitrate, wherein a mercurating agent selected from the group consisting of mercuric acetate and mercuric nitrate is reacted with benzene, the step which comprises carrying out the mercuration reaction in the presence of at least one fluoride selected from the group consisting of hydrogen fluoride, boron trifluoride and antimony trifluoride.

2. In a method of producing a mercuric salt selected from the group consisting of phenyl mercuric acetate and phenyl mercuric nitrate, wherein a mercurating agent selected from the group consisting of mercuric acetate and mercuric nitrate is reacted with benzene, the step which comprises carrying out the mercuration reaction in the presence of boron trifluoride.

3. In a method of producing a mercuric salt selected from the group consisting of phenyl mercuric acetate and phenyl mercuric nitrate, wherein a mercurating agent selected from the group consisting of mercuric acetate and mercuric nitrate is reacted with benzene, the step which comprises carrying out the mercuration reaction in the presence of antimony trifluoride.

4. In a method of producing a mercuric salt selected from the group consisting of phenyl mercuric acetate and phenyl mercuric nitrate, wherein a mercurating agent selected from the group consisting of mercuric acetate and mercuric nitrate is reacted with benzene, the step which comprises carrying out the mercuration reaction in the presence of hydrogen fluoride.

5. In a method for the preparation of a monomercuric salt selected from the group consisting of phenyl monomercuric acetate and phenyl monomercuric nitrate, the steps which comprise reacting a solution containing benzene and a mercuric salt selected from the group consisting of mercuric acetate and mercuric nitrate in the presence of at least one fluoride selected from the group consisting of hydrogen fluoride, boron trifluoride and antimony trifluoride, the reaction being carried out at substantially atmospheric pressure at temperatures not in excess of refluxing temperatures.

6. In a method for the preparation of a monomercuric salt selected from the group consisting of phenyl monomercuric acetate and phenyl monomercuric nitrate, the steps which comprise reacting a solution containing benzene, acetic acid, and a mercuric salt selected from the group consisting of mercuric acetate and mercuric nitrate in the presence of at least one fluoride selected from the group consisting of hydrogen fluoride, boron trifluoride and antimony trifluoride, the benzene being in molal excess over said mercuric salts, the reaction being carried out at not substantially exceeding atmospheric pressure and at a temperature not exceeding refluxing temperatures.

7. In a method for producing phenyl monomercuric acetate, the steps which comprise reacting a solution containing benzene, mercuric acetate, and acetic acid, in the presence of at least one fluoride selected from the group consisting of hydrogen fluoride, boron trifluoride and antimony trifluoride, and recovering the phenyl monomercuric acetate therefrom.

8. In a method of producing phenyl monomercuric acetate, the steps which comprise reacting, at substantially atmospheric pressure and at a temperature not in excess of refluxing temperatures, a solution comprising acetic acid, mercuric acetate, and benzene, in the presence of boron trifluoride, concentrating the reaction mixture, and recovering the phenyl monomercuric acetate therefrom.

9. In a method for the preparation of phenyl monomercuric acetate, the steps which comprise reacting a solution containing mercuric acetate, acetic acid, and benzene, in the presence of at least one fluoride selected from the group consisting of hydrogen fluoride, boron trifluoride and antimony trifluoride, the acetic acid and the benzene being present in large molal axcess over the amounts required to react with the mercuric acetate to produce the phenyl monomercuric acetate, and the aforesaid fluoride being present in minor proportions, the reaction being carried out at substantially atmospheric pressure for a period of about 1 to about 4 hours.

10. In a method of producing phenyl monomercuric acetate, the steps which comprise dissolving mercuric oxide in glacial acetic acid, admixing a glacial acetic acid solution of boron trifluoride therewith, the glacial acetic acid being present in proportions of about 5 to about 25 mols per mol of mercuric oxide, and the boron trifluoride being present in proportions of approximately 1 to 20 mol percent per mol of mercuric oxide, adding from about 3 to about 20 mols of benzene for each mol of mercuric oxide, reacting the mixture at substantially atmospheric pressure, and recovering the phenyl monomercuric acetate.

11. In a method of producing phenyl monomercuric acetate, the steps which comprise dissolving mercuric oxide in glacial acetic acid, admixing a glacial acetic acid solution of boron trifluoride therewith, the glacial acetic acid being present in proportions of about 15 to about 20 mols per mol of mercuric oxide, and the boron trifluoride being present in proportions of approximately 3 to 10 mol percent per mol of mercuric oxide, adding from about 7 to about 12 mols of benzene for each mol of mercuric oxide, refluxing the mixture at substantially atmospheric pressure, concentrating the reaction mixture in vacuo and recovering the benzene and acetic acid which distill over, recovering the phenyl monomercuric acetate from the concentrated solution, and re-using the recovered benzene and acetic acid to produce phenyl mercuric acetate by admixing therewith mercuric oxide, glacial acetic acid, boron trifluoride and benzene in the requisite proportions and carrying out the reaction to produce phenyl monomercuric acetate.

12. In a method for the preparation of phenyl monomercuric nitrate, the steps which comprise reacting a solution containing mercuric nitrate, acetic acid, and benzene in the presence of at least one fluoride selected from the group consisting of hydrogen fluoride, boron trifluoride and antimony trifluoride, the benzene being present in large molal excess over the amount required to react with the mercuric nitrate to produce the phenyl monomercuric nitrate, the reaction being carried out at substantially atmospheric pressure and at a temperature between about 50 degrees C. and refluxing temperature.

13. In a method of producing a mercuric salt selected from the group consisting of phenyl mercuric acetate and phenyl mercuric nitrate, wherein a mercurating agent selected from the group consisting of mercuric acetate and mercuric nitrate is reacted with benzene, the step which comprises carrying out the mercuration reaction in the presence of at least one fluoride of an element selected from the group consisting of hydrogen, boron and antimony.

14. In a method for the preparation of a monomercuric salt selected from the group consisting of phenyl monomercuric acetate and phenyl monomercuric nitrate, the steps which comprise reacting a solution containing benzene and a mercuric salt selected from the group consisting of mercuric acetate and mercuric nitrate in the presence of at least one fluoride of an element selected from the group consisting of hydrogen, boron and antimony, the reaction being carried out at substantially atmospheric pressure at temperatures not in excess of refluxing temperatures.

15. In a method for the preparation of a monomercuric salt selected from the group consisting of phenyl monomercuric acetate and phenyl monomercuric nitrate, the steps which comprise reacting a solution containing benzene, acetic acid, and a mercuric salt selected from the group consisting of mercuric acetate and meruric nitrate in the presene of at least one fluoride of an element selected from the group consisting of hydrogen, boron and antimony, the benzene being in molal excess over said mercuric salts, the reaction being carried out at not substantially exceeding atmospheric pressure and at a temperature not exceeding refluxing temperatures.

JULIUS F. KAPLAN.
CHARLES MELLICK.

REFERENCES CITED

The following references are of record in the file of this patent:

UNITED STATES PATENTS

| Number | Name | Date |
|---|---|---|
| 1,786,094 | Taube | Dec. 23, 1940 |
| 2,353,312 | Kobe et al. | July 11, 1944 |

FOREIGN PATENTS

| Number | Country | Date |
|---|---|---|
| 699,773 | Germany | Dec. 5, 1940 |

OTHER REFERENCES

Industrial and Eng. Chem., vol. 34 (1942), pp. 309–313. (Kobe et al.)

Ruff, Ber. deutsch Chem. Ges., vol. 39, pages 4310–4318 (1906).